United States Patent [19]

Nagakura et al.

[11] Patent Number: 5,784,063

[45] Date of Patent: Jul. 21, 1998

[54] GEOMETRIC CONSTRAINT CONDITION DISPLAYING APPARATUS

[75] Inventors: Masahiro Nagakura; Hideaki Kondo; Shigeyuki Kuroyanagi, all of Shizuoka, Japan

[73] Assignee: Fujitsu Limited, Kawasaki, Japan

[21] Appl. No.: 490,012

[22] Filed: Jun. 13, 1995

[30] Foreign Application Priority Data

Aug. 24, 1994 [JP] Japan .................... 6-199978

[51] Int. Cl.$^6$ .................................. G06T 7/60
[52] U.S. Cl. .................................. 345/420
[58] Field of Search .................... 395/120, 119, 395/953, 133, 140–142; 345/419, 420, 440–442, 433

[56] References Cited

U.S. PATENT DOCUMENTS

| | | | |
|---|---|---|---|
| 4,868,761 | 9/1989 | Hayashi | 364/474.24 |
| 5,297,057 | 3/1994 | Kramer et al. | 345/953 X |
| 5,371,845 | 12/1994 | Newell et al. | 345/347 |
| 5,390,294 | 2/1995 | Takeuchi | 345/441 |
| 5,465,324 | 11/1995 | Lee et al. | 345/433 |
| 5,490,241 | 2/1996 | Mallgren et al. | 345/440 |
| 5,497,452 | 3/1996 | Shimizu et al. | 345/420 |
| 5,502,800 | 3/1996 | Kitagawa et al. | 345/433 |
| 5,566,286 | 10/1996 | Minami et al. | 345/431 |
| 5,636,338 | 6/1997 | Moreton | 345/442 |

FOREIGN PATENT DOCUMENTS

| | | |
|---|---|---|
| 0 241 071 | 10/1987 | European Pat. Off. |
| 2-129764 | 5/1990 | Japan . |
| 5-181939 | 7/1993 | Japan . |
| 5-266150 | 10/1993 | Japan . |

OTHER PUBLICATIONS

Alpert, Graceful Interaction with Graphical Constraints. IEE Computer Graphics & Applications, pp. 82–91, Mar. 1993.

Ponce et al., An Algebraic Approach to Line–Drawing Analysis in the Presence of Uncertainty, Robotics and Automation, pp. 1786–1791, Apr. 1992.

*Primary Examiner*—Anton Fetting
*Attorney, Agent, or Firm*—Staas & Halsey

[57] ABSTRACT

A geometric constraint memory processing section causes a data memory section to temporarily store geometric constraint conditions inputted by an input unit. A geometric constraint display data processing section creates geometric constraint display data from individual items of geometric constraint data read from this data memory section. An assembly processing unit shifts solid shape data created by a solid shape creating unit within a display space on the basis of the geometric constraint data and thus creates three-dimensional model display data. A display processing unit displays all the geometric constraint conditions in superposition on the three-dimensional model displayed by the three-dimensional model display data.

13 Claims, 11 Drawing Sheets

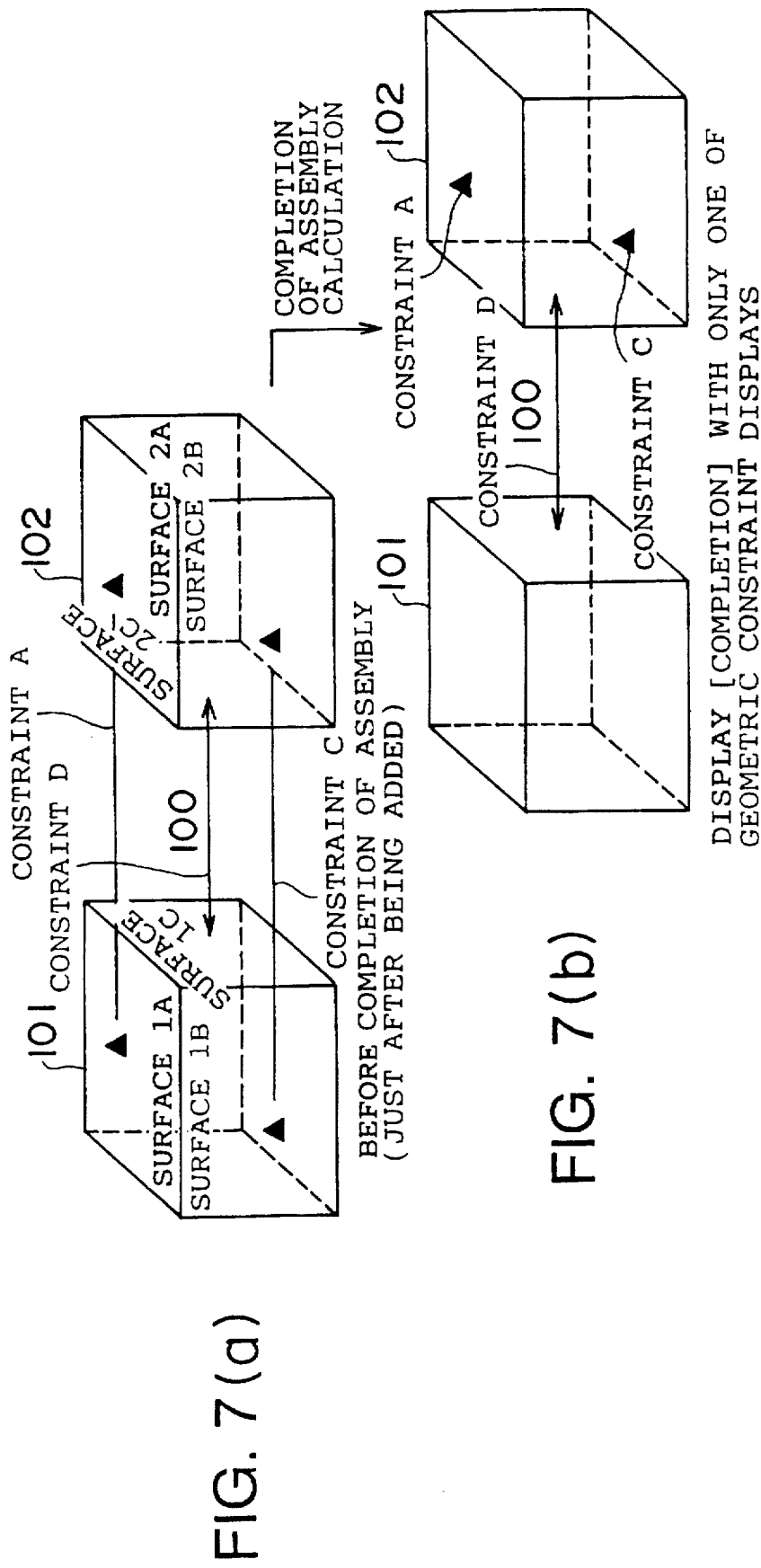

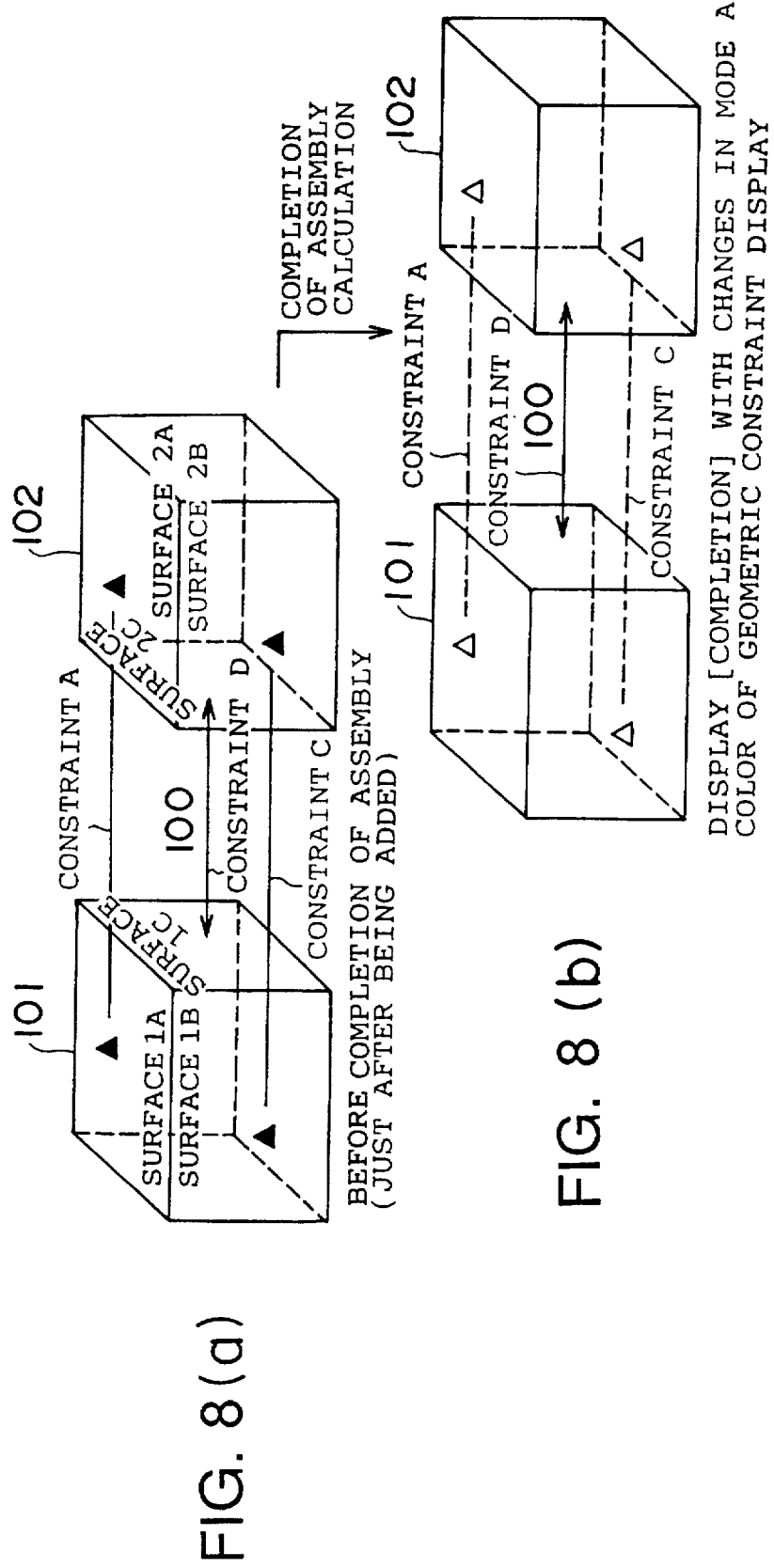

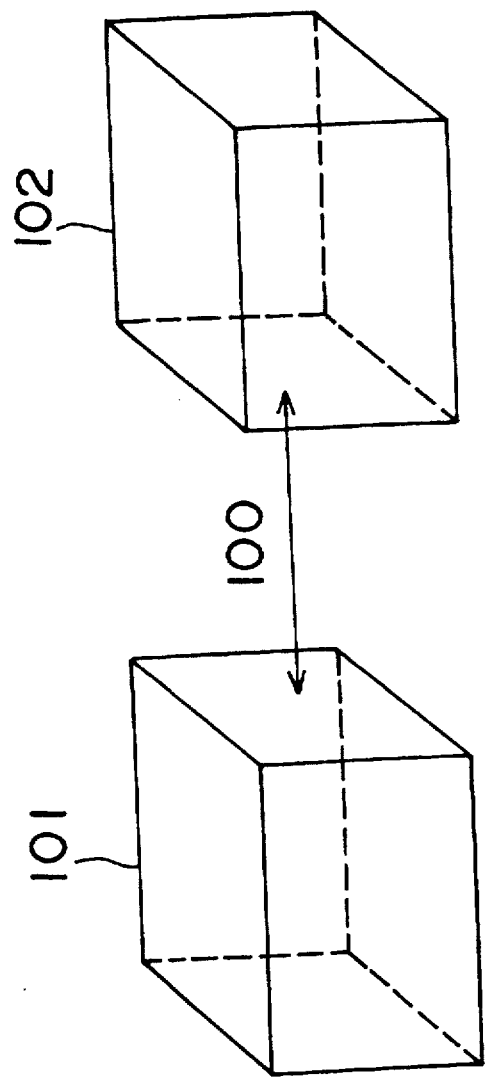

GEOMETRIC CONSTRAINT CONDITION DISPLAYING APPARATUS

BACKGROUND OF THE INVENTION

1. Field of the Invention

The present invention relates to a geometric constraint condition displaying apparatus for displaying geometric constraint conditions between multidimensional graphics constituting a multidimensional model when assembling the multidimensional model on a multidimensional CAD.

2. Description of the Related Art

For assembling a three-dimensional model of a structure, etc. by use of a three-dimensional CAD, it is the simplest to employ a method of defining points, lines and surfaces (which configure the three-dimensional model) by directly designating coordinate values on three-dimensional coordinates. According to this method, however, it is not easy to change positional relationships between individual solids serving as parts configuring the three-dimensional model. For this reason, a method of defining geometric constraint conditions for the solid has hitherto been developed.

Giving a specific description of this method, each of solids serving as parts configuring the three-dimensional model will be defined by use of the three-dimensional coordinates independent of coordinates of a space for assembling the three-dimensional model. Next, a solid serving as a basis (hereinafter termed a "fiducial solid") among the thus defined solids is so disposed in an arbitrary coordinate position within the space for assembling the above three-dimensional model as to be oriented in an arbitrary direction. Then, other solids (hereinafter referred to as "constrained solids") are, when disposed in this space, located by setting a plurality of (normally three or more) geometric constraint conditions (a "surface-to-surface coincides", a "line-to-line coincidence", etc.) with respect to the fiducial solid.

An example of the geometric constraint condition will be explained with reference to FIG. 9. FIG. 9 illustrates a state where two solids 101, 102 are defined within the space where the three-dimensional model is assembled. Now, it is assumed that the solid (rectangular parallelopiped) 101 serves as a fiducial solid. In this case, when defining at least one of distance relationships between the solids 101 and 102 and two of relationships between the surfaces forming the individual solids 101, 102, a position and a direction of the cube (rectangular parallelopiped) 102 within this space can be determined. Specifically, for example, there may be defined a relationship of "a surface 1A of the solid 101 and a surface 2A of the solid 102 coincides", a relationship of "a surface 1B of the solid 101 and a surface 2B of the solid 102 coincides" and a relationship of "a distance between a surface 1C of the solid 101 and a surface 2C of the solid 102 is 100".

When using such geometric constraint conditions, the following advantages are to be obtained. That is, if one of the minimum geometric constraint conditions required for determining a position and a direction of the constrained solid is deleted, it follows that the constrained solid has one degree of freedom with respect to the fiducial cube. Namely, the constrained solid is shiftable in the direction to which this degree of freedom is given. Accordingly, a positional relationship or directional relationship between the solids can be determined simply by setting a new geometric constraint condition within a range of this degree of freedom. For instance, this goes such that the initial geometric constraint condition decided such as "the surface 1A of the solid 101 and the surface 2A of the solid 102 are parallel planes" is changed to a geometric constraint condition of "the surface 1A of the solid 101 and the surface 2A of the solid 102 coincides". Similarly, the position and the direction of the constrained solid can be arbitrarily redetermined by arbitrarily resetting the remaining geometric constraint conditions.

In the conventional three-dimensional CAD system using the above-mentioned geometric constraint conditions, however, after the minimum geometric constraint conditions needed have been once set, qualitative constraint conditions are not displayed on the screen of the three-dimensional CAD system. That is, as illustrated in FIG. 10, though a quantitative geometric constraint condition expressible as a quantity as in the case of a "surface-to-surface distance", the qualitative geometric constraint conditions such as the "surface-to-surface coincides", the "line-to-line coincidence" and so on are not displayed on the screen.

For this reason, after the minimum geometric constraint conditions have been once set, it is impossible to recognize which geometric constraint condition has been set. Accordingly, after setting the geometric constraint conditions, some of the thus set geometric constraint conditions can not be selected and then edited, that is, they can not be deleted or changed.

Therefore, in the conventional three-dimensional CAD system, if the geometric constraint conditions are changed after the minimum geometric constraint conditions have been once set, and even if they are some of the all geometric constraint conditions, this requires such operations that all the set geometric constraint conditions are to be once deleted, and the geometric constraint conditions are newly reset once again.

As described above, there is a problem inherent in the conventional three-dimensional CAD system, wherein an operation efficiency to change the geometric constraint conditions for shifting the solid is poor.

SUMMARY OF THE INVENTION

It is a primary object of the present invention, which was devised in view of the problems given above, to provide a geometric constraint condition displaying apparatus easy to edit geometric constraint conditions and therefore capable of moving multidimensional graphics at a high efficiency.

A geometric constraint condition displaying apparatus according to the present invention displays geometric constraint conditions for regulating positional relationships between elements of a plurality of multidimensional graphics arranged within a multidimensional space. This geometric constraint condition displaying apparatus comprises a first memory section for storing plural items of graphic display data for displaying each of the plurality of multidimensional graphics and a second memory section for storing the geometric constraint conditions. The apparatus further comprises a display device for displaying the plurality of multidimensional graphics based on the plural items of graphic display data stored in the first memory section within the multidimensional space in positional relationships in conformity with the geometric constraint conditions stored in the second memory section and performing the display for specifying the elements of the multidimensional graphics regulated by the geometric constraint conditions and types of the constraints with respect to all the geometric constraint conditions.

The first memory section and the second memory section may be non-volatile mediums such as a disk device, etc. or may be volatile mediums for a temporary storage such as a main memory device of a CPU. Further, the first memory section and the second memory section may be constructed within the same apparatus or within separate apparatuses.

The multidimensional graphic is a plane graphic existing in two dimensions or a solid graphic existing in a three-dimensional space. This multidimensional graphic is disposed in an arbitrary position in the multidimensional space and oriented in an arbitrary direction without the shape of itself deformed.

This geometric constraint condition is a condition for determining mutual positional relationships between a plurality of multidimensional graphics arranged within the multidimensional space. In this case, the geometric constraint condition may be so set as to be determined between a pair of multidimensional graphics. So, in order to determine positional relationships of three or more multidimensional graphics, plural of such geometric constraint conditions defining positional relationship between pair of the graphics may be determined in chain. The geometric constraint condition is intended to determine the positional relationship of the individual elements, i.e., surfaces, lines and points which configure the multidimensional graphic with respect to the elements of other multidimensional graphics. The geometric constraint conditions may be exemplified like this: a "surface-to-surface parallelism", a "surface-to-surface coincidence (this implies that the surface or the extension surface thereof exists on the same plane as other plane)", a "straight-line-to-straight-line parallelism", a "straight-line-to-surface coincidence", a "straight-line-to-straight-line coincidence (this implies that the straight line and the straight line exist on the same axis)", a "point existence on surface (this includes a point existence on plane surface, a point existence on cylindrical surface, a point existence on conical surface, a point existence on spherical surface and a point existence on torus surface)", a "point existence on line (this includes a point existence on straight line and a point existence in shape of circular arc)", a "point-to-point coincidence", a "degree-of-freedom for rotation (this means that in the case the solid takes a shape in rotational symmetry through an arbitrary angle, and even when a rotational position of this graphic is not specifically determined, it is presumed that the rotational position thereof be established)", a "surface-to-surface distance", a "straight-line-to-straight-line distance", a "point-to-surface distance", a "point-to-straight-line distance", a "point-to-point distance", "relative coordinates between coordinate systems (this is a relative distance on the display coordinate between the coordinate systems stored in the first memory section for determining individual solids)" and a "relative angle between coordinate systems (this is a relative angle on the display coordinate between the coordinate systems stored in the first memory section for determining individual solids)".

The displaying means can be constructed of a display unit for effecting visual external outputting and a processing unit for creating image data that are to be displayed on this display unit. This displaying means incorporates a function to display a state where the multidimensional solids are arranged within the multidimensional space in the positional relationships based on the geometric constraint conditions and a function to perform the display for specifying the individual elements of the multidimensional graphics and types of the constraint thereof. Specifying the pair of elements the positions of which are regulated by geometric constraint conditions may be done by displaying a line connecting the elements. If done in this way, even when the geometric constraint conditions are complicatedly linked, the respective elements can be easily specified. Further, this may be done by displaying the same symbols and numerals on the corresponding elements or by putting the same coloring on the corresponding element. Further, specifying the type of the constraint condition may be done by displaying the same symbols or numerals corresponding to the types of the geometric constraint on the elements regulated in position by the geometric constraint conditions. If specified in this manner, the types of the constraint condition can be easily made without specifying the types of the constraint condition with characters. The displaying means, when establishing the positional relationships between the plurality of multidimensional graphics in accordance with the plurality of geometric constraint conditions stored in the second memory section, may perform the display for specifying the elements regulated in position by the geometric constraint conditions and the types of the constraint conditions in a mode different from that before being established. If done in this way, it is possible to recognize whether or not the positional relationships between the multidimensional graphics are established at a glance. For instance, a display color for specifying the elements regulated in position by the geometric constraint conditions and the types of the constraint conditions thereof may be changed to other color after being established. Further, the respective elements may be specified by displaying a line which connects the pair of elements regulated in position by the above geometric constraint conditions before being established, and this line may be erased after being established. In addition, there are displayed the symbols or numerals corresponding to the type of the constraint condition on the pair of elements which are regulated in position by the geometric constraint condition before being established, and only the symbol or numeral displayed on one element may be erased after being established.

Added to the construction according to the present invention are an inputting means for inputting the geometric constraint conditions and a geometric constraint condition updating means for updating the geometric constraint conditions stored in the second memory section and inputted by the inputting means. With this addition, the geometric constraint conditions can be arbitrarily edited. The displaying means according to the present invention displays all the geometric constraint conditions, whereby such editing can be conducted. On this occasion, the inputting means is capable of receiving the input of each of the individual geometric constraint conditions. The inputting means may receive an input of the effect that a specified geometric constraint condition is to be deleted. In this case, the geometric constraint condition updating means deletes the specified geometric constraint condition from within the second memory section. When the geometric constraint conditions stored in the second memory section is thus updated, the displaying means locates the multidimensional graphics in accordance with the updated geometric constraint conditions and performs the display for specifying the elements located based on the updated geometric constraint conditions and the types of the constraint condition thereof.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 7(a) and 7(b) are explanatory views illustrating a variation in terms of a mode of displaying the geometric constraint conditions before and after assembling three-dimensional model display data;

FIGS. 8(a) and 8(b) are explanatory views illustrating a variation in the mode of displaying the geometric constraint conditions before and after assembling the three-dimensional model display data;

FIG. 10 is an explanatory view illustrating a mode of displaying geometric constraint conditions in the prior art.

DESCRIPTION OF THE PREFERRED EMBODIMENT

An embodiment of the present invention will hereinafter be described with reference to the drawings.

<Principle of Embodiment>

Figure 1:
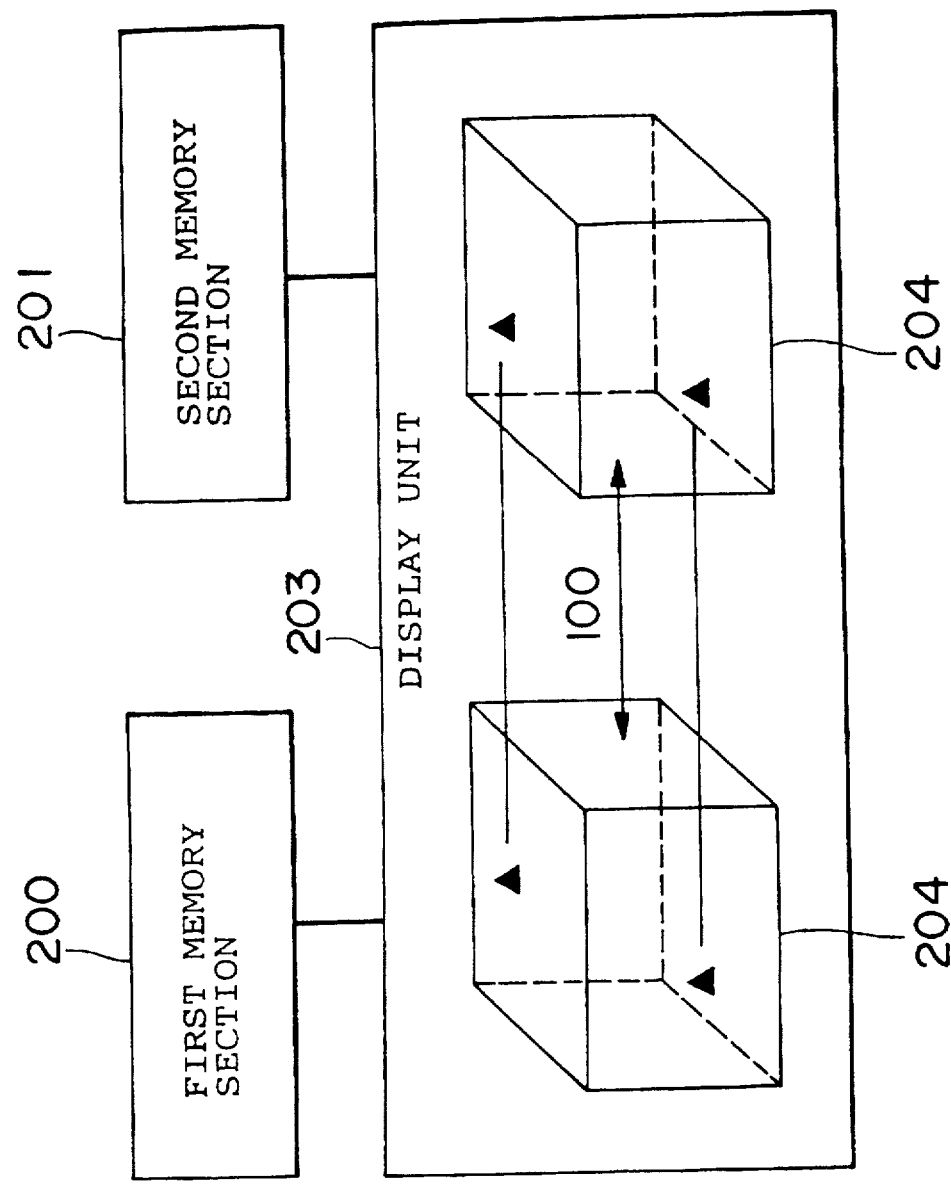
FIG. 1 is a view showing the principle of an embodiment of the present invention.

The principle of this embodiment will be demonstrated with reference to FIG. 1. A first memory unit 200 stores graphic display data for displaying a plurality of a multidimensional graphic. On the other hand, a second memory unit 201 stores geometric constraint conditions. A display unit 203 is informed of the graphic display data and the geometric constraint conditions.

The display unit 203 displays a state where the multidimensional graphic is disposed within a multidimensional space on the basis of the thus informed graphic display data. When plural items of the informed graphic display data are prepared, the display unit 203 locates the multidimensional graphics constraining the position of them on the basis of the informed geometric constraint conditions. That is, the display unit 203 regulates positional relationships between constructive elements of the respective multidimensional graphics in accordance with the geometric constraint conditions, thereby locating the multidimensional graphics. The display unit 203 also performs displaying for specifying the constructive elements of these multidimensional graphics thus located under the geometric constraint conditions and the type of the the constraints. The displaying for this specification is conducted with respect to all the geometric constraint conditions. Accordingly, when viewing the multidimensional graphic displayed thereon, it is possible to know what kind of geometric constraint is put on which constructive element at a glance.

The geometric constraint conditions can be arbitrarily edited by providing an input unit for inputting the geometric constraint conditions and a geometric constraint condition update unit for updating the geometric constraint conditions stored in the second memory unit 201 and inputted by this input unit.

If the positional relationships between the plurality of multidimensional graphics are established based on the geometric constraint conditions stored in the second memory unit 201, the display unit 203 changes display mode for specifying the constructive elements to be constrained and the type of the constraints from the display mode before being established. Therefore, whether the locations of the graphics are established or not can be known at a glance.

<Construction of Three-Dimensional CAD System>

Figure 2:
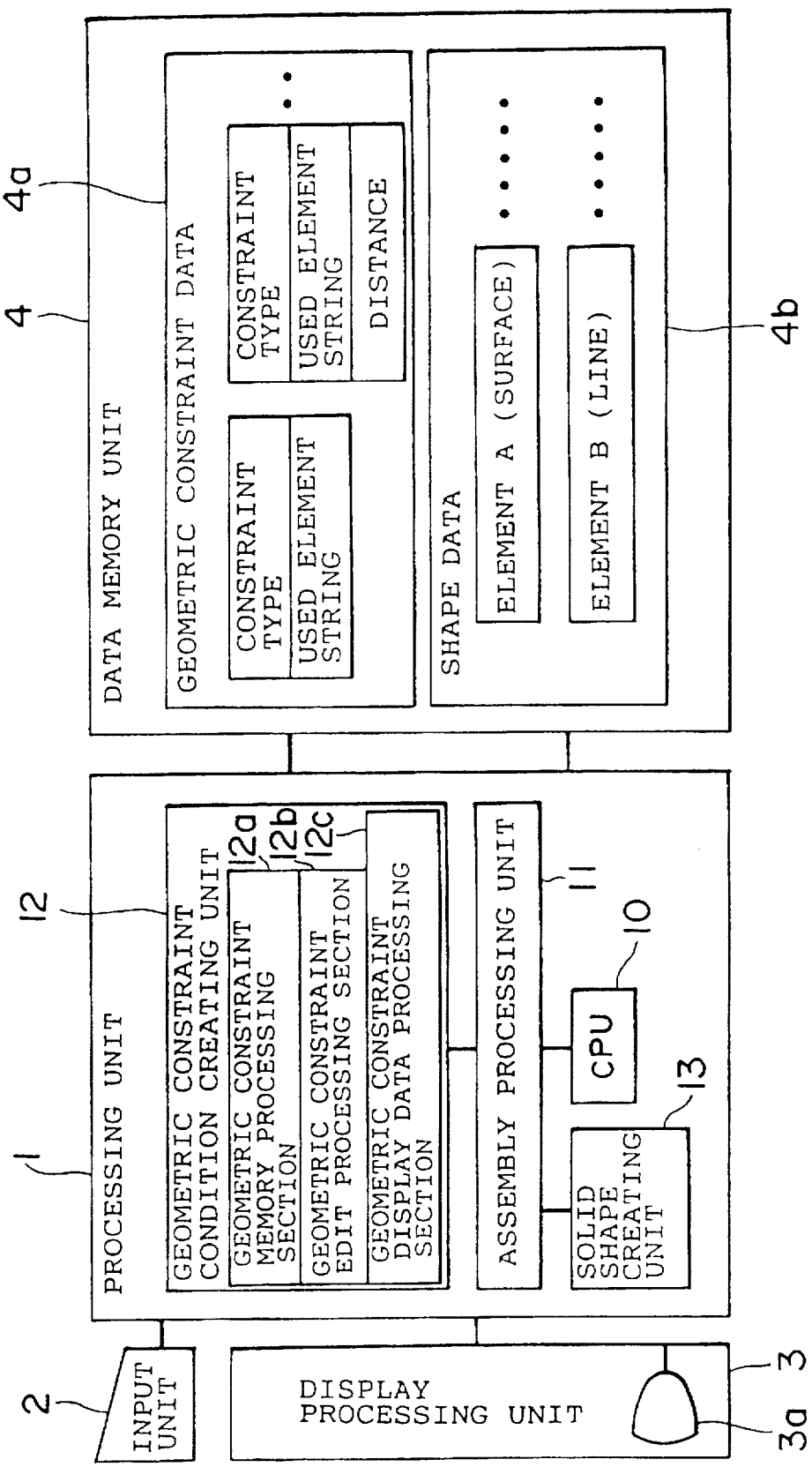
FIG. 2 is a block diagram illustrating a construction of a three-dimensional CAD system including a geometric constraint condition displaying apparatus for a three-dimensional model in the embodiment of the present invention.

FIG. 2 is a block diagram illustrating a construction of a three-dimensional CAD system including the geometric constraint display apparatus in accordance with the embodiment of the present invention.

This three-dimensional CAD system is constructed of a processing unit 1, and an input unit 2, a display processing unit 3 and a data memory unit 4 that are respectively connected to the processing unit 1.

This processing unit 1 controls the three-dimensional CAD system as a whole and creats a three-dimensional model to be displayed. Further, the input unit 2 inputs the data to the processing unit 1. Also, the display processing unit 3 displays the three-dimensional model created in the processing unit 1. Moreover, the data memory unit 4 stores the data employed for creating the three-dimensional model in the processing unit 1.

The input unit 2 comprises a keyboard and a mouse and incorporates a function of inputting, to the processing unit 1, a variety of items of data for displaying the three-dimensional model that the operator desires to display.

A data memory unit 4 is constructed of, specifically, a geometric constraint data memory section 4a serving as a first memory unit and a shape data memory section 4b serving as a second memory unit. This shape data memory section 4b stores solid shape data for defining a shape of each of solids constituting the three-dimensional model. The solid shape data about the individual solids are stored while being separated into an item of data about a surface (element A) and an item of data about a line (element B). On the other hand, the geometric constraint data memory section 4a stores the geometric constraint conditions for defining the positional relationships between the individual solids. Each geometric constraint condition is stored with a separation into the type of the constraint condition and used element string (and distance). These constraint definitions will be specifically exemplified as below. That is, there are a "surface-to-surface parallelism", a "surface-to-surface coincidence (this implies that the surface or the extension surface thereof exists on the same plane as other plane)", a "straight-line-to-surface coincidence", a "straight-line-to-straight-line parallelism", a "straight-line-to-straight-line coincidence (this implies that the straight line and the straight line exist on the same axis)", a "point existence on surface (this includes a point existence on plane surface, a point existence on cylindrical surface, a point existence on conical surface, a point existence on spherical surface and a point existence on torus surface)", a "point existence on line (this includes a point existence on straight line and a point existence in shape of circular arc)", a "point-to-point coincidence", a "degree-of-freedom for rotation (this means that, in the case the cube takes a shape in rotational symmetry through an arbitrary angle, and even when a rotational position of this graphic is not specifically determined, it is presumed that the rotational position thereof be established)", "a surface-to-surface distance", a "straight-line-to-straight-line distance", a "point-to-surface distance", a "point-to-straight-line distance", a "point-to-point distance", "relative coordinates between coordinate systems (that is, a relative distance on the display coordinate between the coordinate systems for determining the individual solids stored in the shape data memory section 4b)" and a "relative angle between coordinate systems (that is, a relative angle on the display coordinate between the coordinate systems for determining the individual solids stored in the shape data memory section 4b)". The used element string is intended to concretely specify combinations of the elements (surfaces, lines, points, coordinates, etc.) to which the geometric constraint conditions specified by the corresponding constraint definitions are actually applied.

The processing unit 1 is constructed of a CPU (central processing unit) 10, an assembly processing unit 11 connected to this CPU 1, a geometric constraint condition creating unit 12 connected to this assembly processing unit 11 and a solid shape creating unit 13 connected to the assembly processing unit 11. The assembly processing unit 11, the geometric constraint condition creating unit 12 and the solid shape creating unit 13 are actually constructed of memories (RAM) for storing programs for actualizing functions thereof. The CPU 10 is a processor for executing the programs stored in these memories and actualizing the functions of the respective units 11, 12, 13. Further, the CPU 10 executes I/O processing between the input unit 2, the display processing unit 3 and the data memory unit 4 under control of an operation system (OS).

The solid shape creating unit 13 creates solid shape data for displaying the solids (cube, rectangular parallelopiped, circular cylinder, sphere, etc.) serving as parts constituting the three-dimensional model on the basis of the data inputted by the input unit 2. Each of the solid shape data are created within the coordinate system independently of the display coordinate system for creating the three-dimensional model.

The geometric constraint condition creating unit 12 creates the geometric constraint conditions for defining the mutual positional relationships between the solids created by the solid shape creating unit 13 and the geometric constraint display data for displaying the geometric constraint conditions on a screen based on the data inputted by the input unit 2. To describe it more specifically, the geometric constraint condition creating unit 12 includes a geometric constraint memory processing section 12a, a geometric constraint edit processing section 12b and a geometric constraint display data processing section 12c.

The geometric constraint memory processing section 12a causes the geometric constraint data memory section 4a of the data memory unit 4 to store the geometric constraint conditions created by the geometric constraint edit processing section 12b and reads the geometric constraint data stored in the data memory unit 4.

The geometric constraint edit processing section 12b performs editing operation of creating the geometric constraint conditions from the data inputted by the input unit 2 and deleting or changing or adding the geometric constraint conditions read from the geometric constraint data memory section 4a of the data memory unit 4 by the geometric constraint memory processing section 12a.

Figures 6A, 6B:
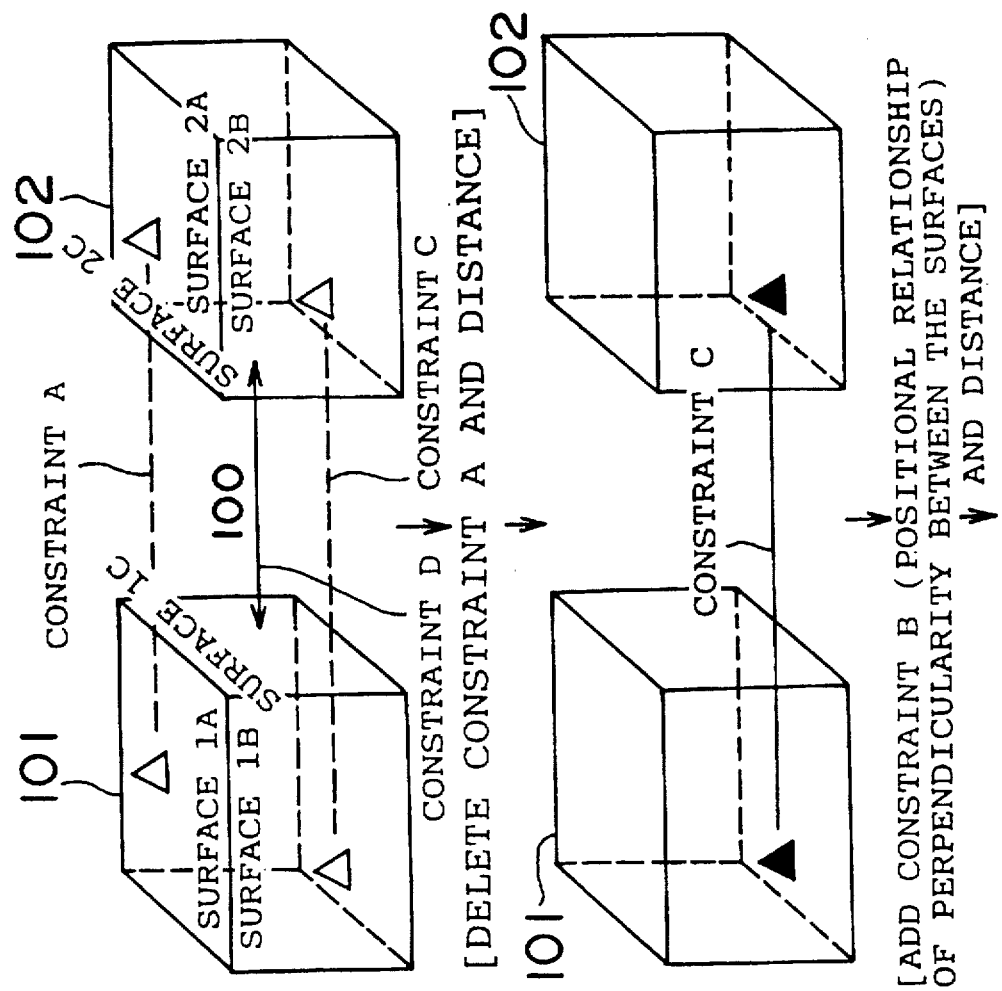
FIGS. 6(a)–6(d) are views illustrating procedures of editing the geometric constraint conditions.
Figure 6C:
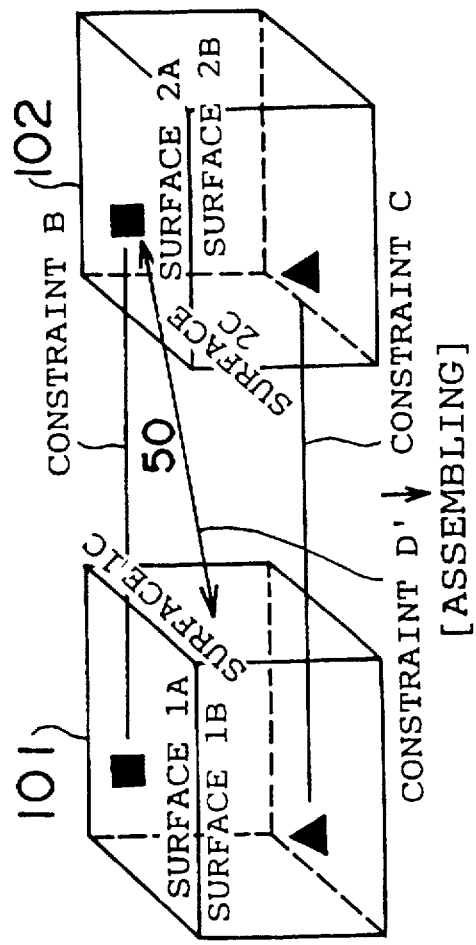
Figure 6D:
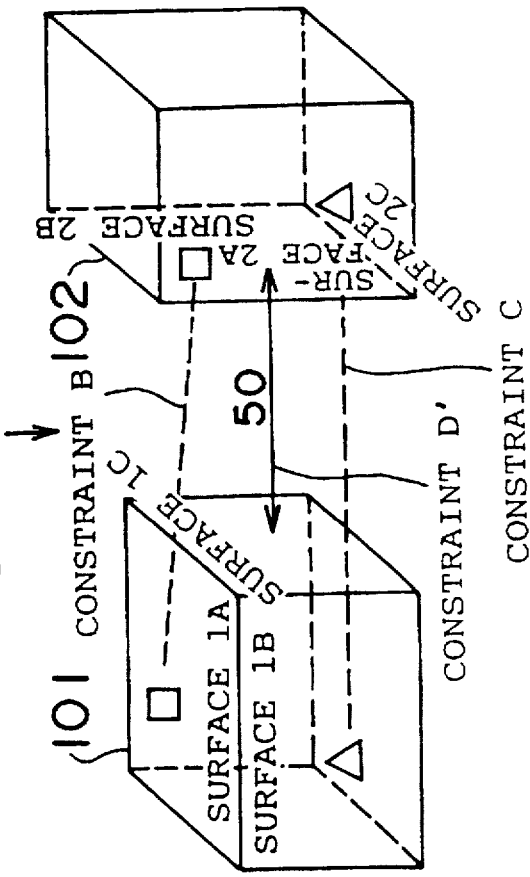
Figure 9:
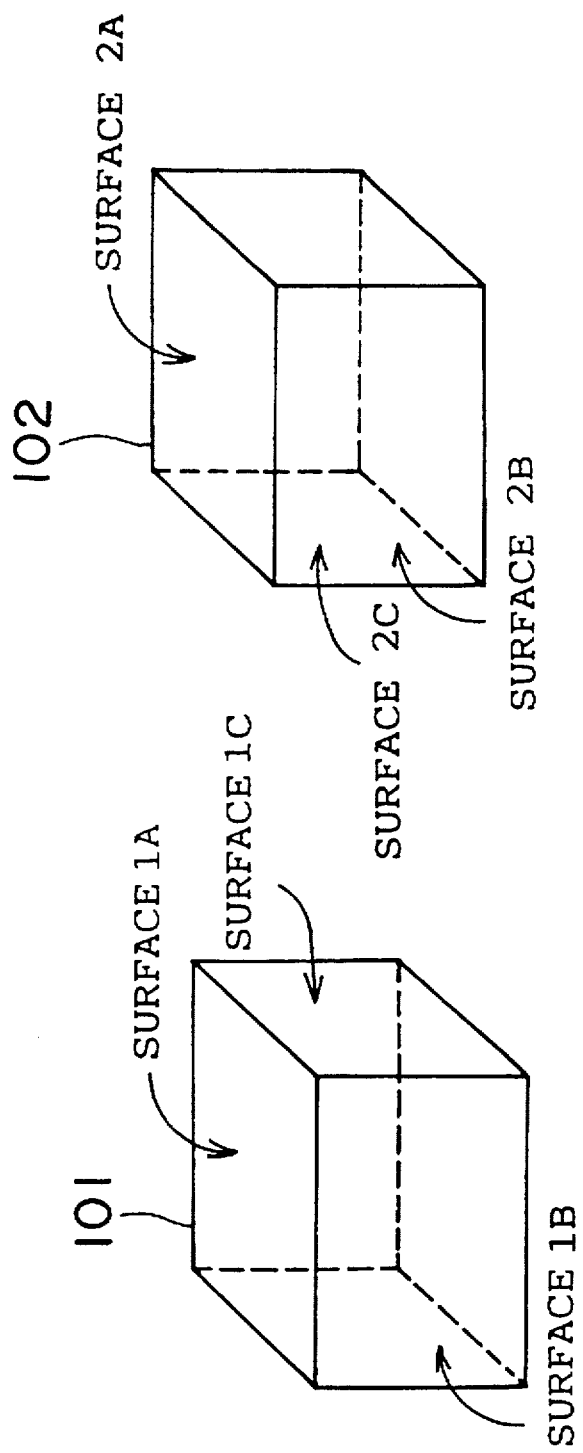
FIG. 9 is an explanatory view illustrating the geometric constraint conditions.

The geometric constraint display data processing section 12c creates the geometric constraint displaying data for visually displaying the geometric constraint conditions on the basis of the geometric constraint conditions edited by the geometric constraint edit processing section 12b. FIG. 6 shows display examples of the geometric constraint conditions based on the geometric constraint display data. As obvious from FIG. 6, displaying the geometric constraint conditions involves the use of patterns (symbols or numerals) indicating the type of the constraints and the straight lines specifying the used element string. That is, triangles shown in FIGS. 6(a)–6(d) indicate the surfaces to which the geometric constraint condition of "surface-to-surface coincidence" is applied. Then, the straight line (connecting line) which connects these blackened triangles indicates a combination of the elements (surfaces) located each other by the geometric constraint condition of "surface-to-surface coincidence". Similarly, squares shown in FIGS. 6(c) and 6(d) indicate the surfaces to which the geometric constraint condition of "surface-to-surface perpendicularity" is applied, and the straight line connecting these squares indicates a combination of the elements (surfaces) located each other by this geometric constraint condition. Arrowed connecting lines marked with numerals, which are shown in FIGS. 6(a), 6(c) and 6(d), indicate a combination of the surfaces to which the geometric constraint condition relative to the distance is applied. Then, the numerals (100, 50) represent distances between the elements (surfaces) shown by the arrows. What is shown in FIG. 6(c), however, indicates a state where a display data assembly (establishment of the positions where the solids are placed) is not yet conducted, and, hence, the displayed meaning of the geometric constraint condition does not coincide with the state where the solids are actually placed. That is, the blackened graphic represents the geometric constraint condition before being established, while the whitened graphic represents the geometric constraint condition after being established. Further, the geometric constraint display data processing section 12c deletes or changes or adds the geometric constraint display data, corresponding to such an operation that the geometric constraint edit processing section 12b deletes or changes or adds the geometric constraint condition. Also, the geometric constraint display data processing section 12c changes a display mode of the geometric constraint condition in accordance with the result of the assembly processing in the assembly processing unit 11.

The assembly processing unit 11 creates the solid display data for displaying each solid on the basis of the solid shape data created by the solid shape creating unit 13 and stored in the shape data memory section 4b of the data memory unit 4. Then, the assembly processing unit 11 executes an arithmetic operation for assembling the solid display data into three-dimensional model display data for displaying the three-dimensional model by shifting the solid display data in conformity with the geometric constraint conditions created by the geometric constraint edit processing section 12b and stored in the geometric constraint data memory section 4a of the data memory unit 4. The assembly processing unit 11 establishes the relative positional relationships between the plurality of solids by executing this arithmetic operation. When executing the arithmetic operation, it is required that the minimum geometric constraint conditions needed for establishing the positional relationships between the individual solids is inputted. Note that the assembly processing unit 11 arranges the respective items of solid display data in arbitrary locations within the display space before effecting the assembly after the minimum geometric constraint conditions needed have been inputted. In the case the three-dimensional model display data had been assembled before, however, some geometric constraint conditions were deleted thereafter, the individual items of solid display data are arranged in the former locations of the three-dimensional model display data. Further, the assembly processing unit 11 adds the geometric constraint display data created by the geometric constraint display data processing section 12c to the three-dimensional model display data (solid display data) assembled in the above-described manner.

The display processing unit 3 includes a display unit 3a. The display processing unit 3 displays the three-dimensional model on the display unit 3a on the basis of the three-dimensional model display data (solid display data) assembled by the assembly processing unit 11 and also displays the geometric constraints thereon in accordance with the geometric constraint display data.

A display means is constructed of this geometric constraint display data processing section 12c and the display processing unit 3.

[Control Content of Three-Dimensional CAD System]

Next, contents of the control processes executed in the processing unit 1 and the display processing unit 3 will be explained with reference to flowcharts of FIGS. 3 through 5.

Figure 3:
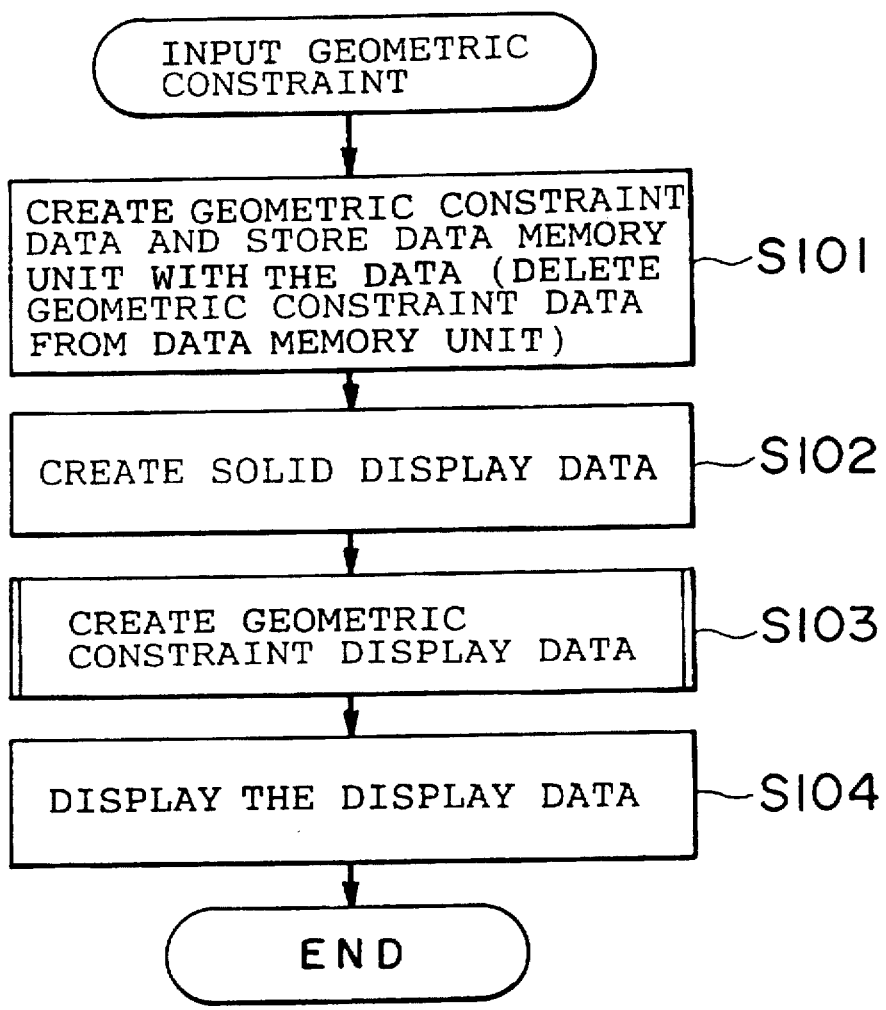
FIG. 3 is a flowchart showing contents of control when inputting geometric constraint conditions.

FIG. 3 shows the processes executed before completing the inputting of the minimum geometric constraint conditions needed for displaying the positional relationships of the solids and before completing the assembly arithmetic operation for establishing the locations of the arrangement thereof.

The processes shown in FIG. 3 will be executed each time a new geometric constraint condition is inputted from the input unit 2 and each time data for editing the geometric constraint conditions is inputted. Then, in first step S101, the geometric constraint edit processing section 12b creates geometric constraint data (containing the type of the constraint and the used element string (and distances)) on the basis of the inputted geometric constraint condition. Subsequently, the geometric constraint memory processing section 12a causes the geometric constraint data memory section 4a of the data memory unit 4 to store the thus created geometric constraint data. Note that the geometric constraint memory processing section 12a, when the data of the effect that the geometric constraint condition is to be deleted is inputted from the input unit 1, deletes the geometric constraint data stored in the geometric constraint data memory section 4a.

In next step S102, the assembly processing unit 11 creates the solid display data. If some geometric constraint conditions are deleted after once assembling of the three-dimensional model display data is executed, the assembly processing unit 11 creates the solid display data wherein the positional relationships of the individual solids remain as they are.

In subsequent step S103, the geometric constraint display data processing section 12c creates the geometric constraint display data.

The display processing unit 3, after the geometric constraint display data and the solid display data have been created in this way, causes the display unit 3a to display the individual solids on the basis of the created solid display data and adds a geometric constraint indication (pattern and connecting line) to display the three-dimensional model based on the created geometric constraint display data in step S104. Then, a series of the processes described above will be ended.

Figure 4:
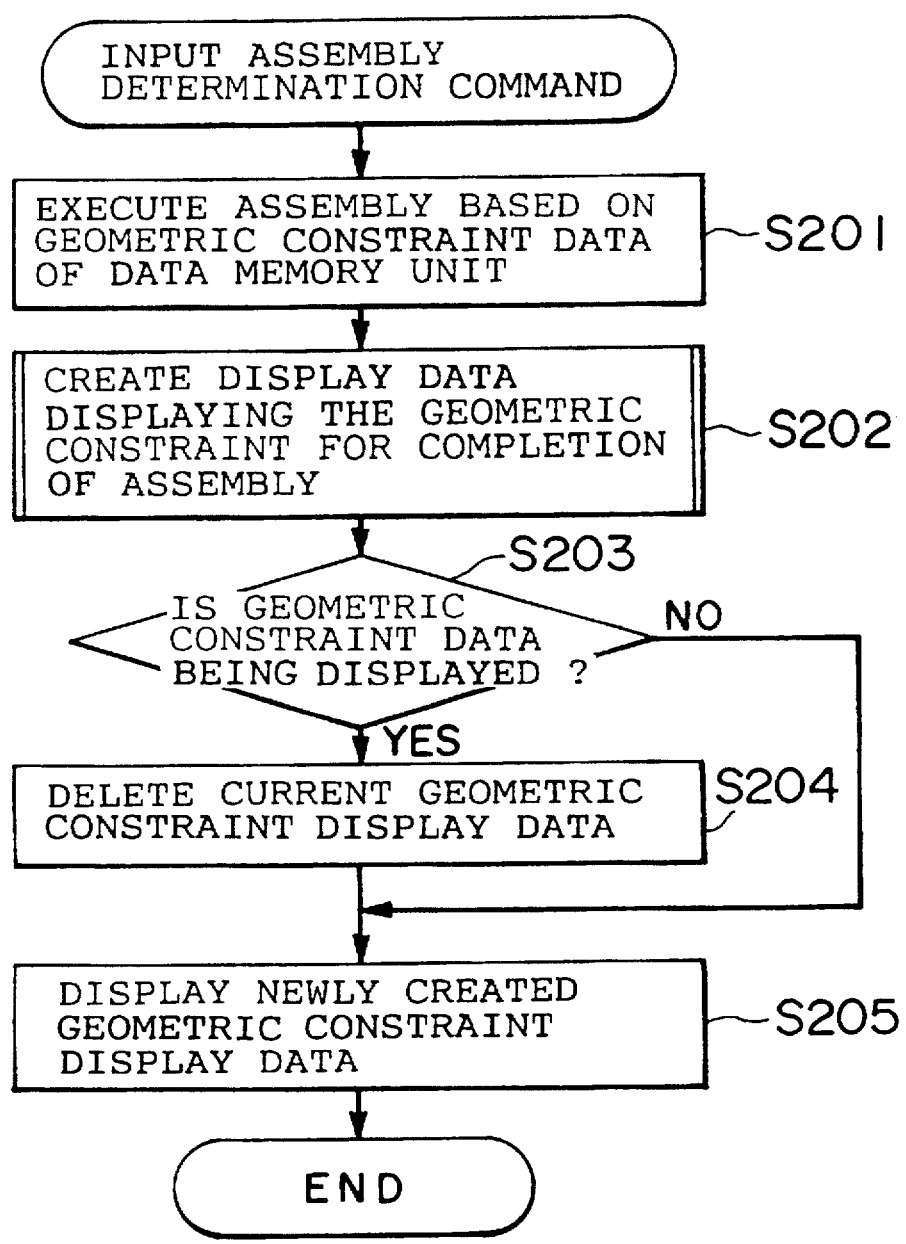
FIG. 4 is a flowchart showing contents of control when inputting an assembly determination instruction.

FIG. 4 shows the processes executed for establishing the locations of the solids after the minimum geometric constraint conditions needed for displaying the positional relationships between the solids are inputted.

The processes shown in FIG. 4 are executed when a command for assembling is given from the input unit 2. Then, in first step S201, the assembly processing unit 11 executes the process of assembling the three-dimensional model display data on the basis of the geometric constraint data stored in the geometric constraint data memory section 4a of the data memory unit 4 and the shape data stored in the shape data memory section 4b thereof.

In next step S202, the geometric constraint display data processing section 12c creates the geometric constraint display data for the completion state of the assembly.

In step S203 after the geometric constraint display data and the three-dimensional model display data have been created in the manner described above, the display processing unit 3 checks whether or not the geometric constraints are being displayed on the display unit 3a. Then, when determining that the geometric constraint display is on the execution, in step S204, the display processing unit 3 deletes the geometric constraint that is now being displayed. Then, the processing proceeds to step S205. While on the other hand, when determining that the geometric constraint display is not on the execution in step S203, the processing skips over step S204 directly to step S205.

In step S205, the display processing unit 3 displays the geometric constraints on the basis of the geometric constraint display data newly created in step S202. Then, a series of the above processes are finished.

Figure 5:
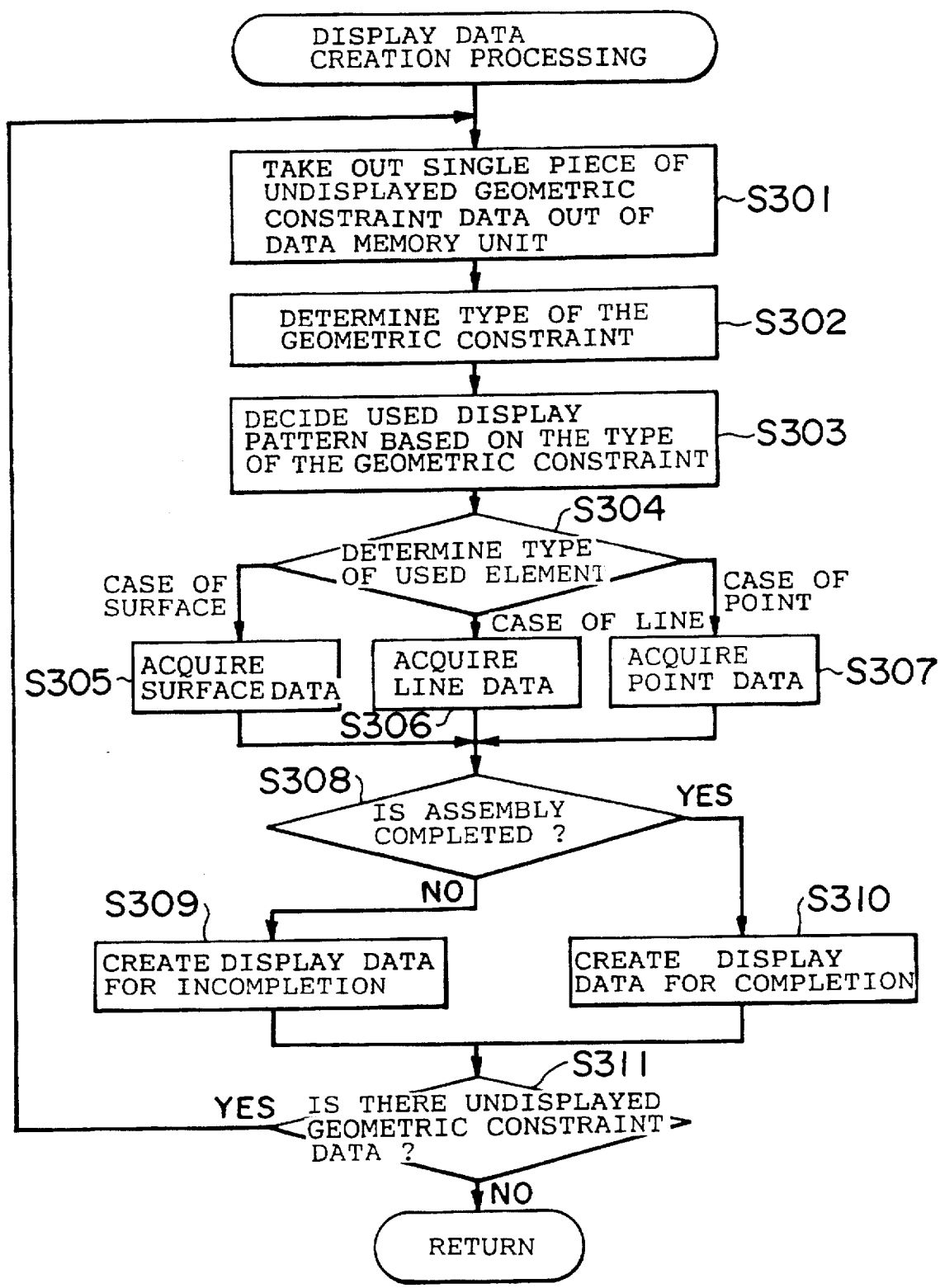
FIG. 5 is a flowchart showing contents of a display data creation processing subroutine executed in step S103 of FIG. 3 or step S202 of FIG. 4.

FIG. 5 shows a subroutine of the processing of creating the geometric constraint display data, which is to be executed by the geometric constraint display data processing section 12c in step S103 of FIG. 3 or step S202 of FIG. 4. According to this subroutine, first in step S301, one piece of undisplayed geometric constraint data is taken out of the geometric constraint data memory section 4a of the data memory unit 4.

Then, in subsequent step S302, the type of the constraint condition of the geometric constraint data taken-out in step S301 is determined. In next step S303, a display pattern (symbol or numeral) to be used is decided corresponding to the type of the constraint determined in step S302.

In next step S304, a type of the used element of the geometric constraint data taken out in step S301 is determined. That is, there is determined whether the element constrained by this geometric constraint is a surface or a line or a point. This determination is effected by analyzing the type of the geometric constraint.

Then, if the used element is classified as the surface, in step S305, an item of surface data is acquired from the corresponding used element string. Further, if the used element is the line, in step S306, an item of line data is acquired from the corresponding used element string. Also, if the used element string is classified as point data, in step S307, the point data is acquired from the corresponding used element string. Note that if the type of the geometric constraint is relative to the distance, a corresponding item of distance data is also acquired in these steps.

In subsequent step S308, there is determined whether or not the assembly processing by the assembly processing unit 11 is completed. If this subroutine is called from step S103 of FIG. 3, the assembly of the three-dimensional model display data is not completed, and, hence, the processing proceeds to step S309. In contrast with this, if the same subroutine is called from step S202 of FIG. 4, the assembly of the three-dimensional model display data is completed in step S201, and, therefore, the processing proceeds to step S310.

In step S309, the geometric constraint display data for incompletion state is created, and the patterns (symbols or numerals) and the connecting lines are displayed with respect to all the geometric constraint conditions. Describing it more specifically, in the case of a qualitative geometric constraint, the display patterns (symbols) decided in step S303 are displayed in display positions of a pair of used elements acquired in one of steps S305 through S307, and also the data for displaying the line connecting therebetween is created. Further, in the case of the geometric constraint relative to the distance, an arrowed line connecting the pair of used elements acquired in one of steps S305 through S307 is displayed, and also the data for displaying the distance in numeral is created.

On the other hand, in step S310, the geometric constraint display data for completion state is created. That is, there is created the geometric constraint display data for displaying the geometric constraints in a different mode from that of the geometric constraint display data for incompletion state created in step S309. To describe it more specifically, as illustrated in FIG. 7, in the case of a qualitative geometric constraint condition, there is created the data for displaying only the display patterns (graphic) decided in step S303 in display positions of the used elements of a constrained solid acquired in one of steps S305 through S307. Further, in the case of the geometric constraint condition pertaining to the distance, as in the same way with step S309, an arrowed line connecting the pair of used elements acquired in one of steps S305 through S307 is displayed, and also the data for displaying the distance in numeral is created.

Note that the geometric constraint display data as shown in FIG. 8 may be available as the completion-oriented geometric constraint display data created in step S310. Describing it more specifically, in the case of the qualitative geometric constraint condition, there may be created the data for displaying the same display pattern and the same connecting line as those of the geometric constraint display data for incompletion state created in step S309 in a color different therefrom. Further, in the case of the geometric constraint condition pertaining to the distance, as in the same way with step S309, the arrowed line connecting the pair of used elements acquired in one of steps S305 through S307 is displayed, and also the data for displaying the distance in numeral is created.

After executing step S309 or S310, the processing goes forward to step S311. In step S311, there is determined whether an undisplayed item of geometric constraint data exists in the geometric constraint data memory section 4a of the data memory unit 4. When this subroutine is called from step S103 of FIG. 3, there is no possibility in which the undisplayed geometric constraint data exists, and hence this subroutine is ended to return to the original processing position. On the other hand, when this subroutine is called from step S202 of FIG. 4, there may be a possibility in which the undisplayed geometric constraint data exists. When the undisplayed geometric constraint data exists, the processing returns to step S301. If the undisplayed geometric constraint data disappears as a result of repeating a loop from step S301 to step S311, this subroutine is ended to return to the original processing position.

<Operation of Embodiment>

The geometric constraint displaying apparatus in this embodiment edits the geometric constraint conditions in the following manner. Now, it is assumed that a fiducial solid 101 for displaying a rectangular parallelopiped and a constrained solid 102 for displaying a rectangular parallelopiped are created as illustrated in FIG. 7(a). Inputted subsequently from the input unit 2 are a geometric constraint condition (constraint A) of "the surface 1A of the solid 101 coincides with the surface 2A of the solid 102", a geometric constraint condition (constraint C) of "the surface 1B of the solid 101 coincides with the surface 2B of the solid 102" and a geometric constraint condition (constraint D) of "the distance between the surface 1C of the solid 101 and the surface 2C of the solid 102 is 100". Hereat, the geometric constraint display as illustrated in FIG. 7(a) is effected on the display unit 3a. FIG. 7(a) shows a state before completing the assembly of the three-dimensional model display data. Accordingly, all the geometric constraint conditions are displayed.

[Display After Completing Assembly]

In this state, when completing a calculation for assembling the three-dimensional model display data after an assembly determination indication has been inputted from the input unit 2, the geometric constraint conditions for assembly-completion state are displayed as shown in FIG. 7(b). Namely, the display of the connecting line for indicating a combination of the used elements of the constraints A and C defined as qualitative constraints is erased. Simultaneously with this erasing, there are erased is display patterns (blackened triangles) indicating the type of the constraint and the used elements of the fiducial cube 101 with the constraints A and C.

As described above, according to this embodiment, the method of displaying the geometric constraint conditions is changed before and after completing (decision of the mutual positional relationship between the solids) the assembly of the three-dimensional model display data. Therefore, whether the assembly is completed or not can be known at a glance. Besides, even after completing the assembly, the type of the geometric constraint can be specified from the display patterns put on the constrained solid 102. Further, it is possible to presume the used element positions on the fiducial solid 101 from the type of the geometric constraint and the used element positions on the constrained solid 102 marked with the display patterns. Accordingly, all the geometric constraint conditions can be confirmed irrespective of the time before and after completing the assembly, and the editing thereof can be also carried out.

Note that if the assembly completion-oriented geometric constraints are displayed as shown in FIG. 8, the assembly completion-oriented geometric constraints are to be displayed as illustrated in FIG. 8(b). That is, the connecting lines and the display patterns (blackened triangles) with the constraints A and C defined as the qualitative constraints are displayed in a color different from that before completing the assembly (see FIG. 8(a)). If done in this way, whether the assembly is completed or not can be known at a glance, and, besides, the geometric constraint conditions can be completely recognized even after completing the assembly. Hence, the geometric constraint conditions can be easily edited.

[Editing of Geometric Constraint Condition]

Given next is an explanation of procedures of editing the geometric constraint conditions in this embodiment.

In accordance with this embodiment, the geometric constraint conditions can be edited regardless of the completion or incompletion of assembling the three-dimensional model display data. FIG. 6 illustrates variations in terms of displaying the geometric constraints when editing the geometric constraint conditions after completing the assembly.

To begin with, FIG. 6(a) shows, as in the case of FIG. 8(b), a state where the respective geometric constraint conditions of the constraints A, C and D are inputted. Herein, the editing is effected to rotate the constrained solid 102 in counterclockwise direction from the state of FIG. 6(a), and to reduce a distance between the solids 101, 102 down to 50.

In this case, as illustrated in FIG. 6(a), it can be understood that the constraints A and D among the individual geometric constraint conditions may be obstacles by viewing the geometric constraint conditions displayed. Accordingly, the operator performs inputting to delete the constraints A and D through the input unit 2.

Hereupon, with an execution of step S101, the geometric constraint data relative to the constraints A and D are deleted from the geometric constraint data memory section 4a of the data memory unit 4. Hence, in step S103, there are created geometric constraint display data from which the geometric constraint displays of the constraints A and D are excluded. In consequence, as illustrated in FIG. 6(b), the geometric constraint displays of the constraints A and D are erased on the display unit 3a. Further, the remaining geometric constraint C is displayed in a mode for the incompletion of the assembly.

Next, for rotating the constrained solid 102, a geometric constraint condition (constraint B) of "the surface 1A of the solid 101 is perpendicular to the surface 2A of the solid 102" is newly inputted through the input unit 2. At the same time, for the purpose of making the constrained solid 102 approach to the fiducial solid 101, a geometric constraint condition (constraint D') of "a distance between the surface 1C of the solid 101 and the surface 2A of the solid 102 is 50" is inputted through the input unit 2. As a result, with an execution of step S103, as shown in FIG. 6(c), the geometric constraint conditions (constraints B and D') are displayed between the elements to which the geometric constraint conditions are applied. At this point of time, however, the assembly is not yet performed, and, therefore, the geometric constraint display mode is directed to the assembly incompletion, and the displayed meaning of this geometric constraint does not coincide with the state where the solid 102 is actually arranged.

Next, when the assembly determination command is inputted, with an execution of step S201, the arrangement position of the solid 102 shifts as shown in FIG. 6(d). That is, the constrained solid 102 rotates counterclockwise through 90 degrees within the plane where this surface 2B exists while satisfying the condition (constraint C) of "the surface 1B of the solid 101 coincides with the surface 2B of the solid 102". Simultaneously, the solid 102 approaches the solid 101 so that the relative distance between the surfaces (surfaces 1C, 2A) facing each other is 50.

As explained above, if further editing is needed after finishing the editing and the assembling, the editing can continue.

According to the present invention, when displaying the multidimensional model in the multidimensional CAD system, it is feasible to easily recognize the added geometric constraint conditions on the screen. Accordingly, each of the displayed geometric constraint conditions can be solely designated and then edited. Hence, editing the geometric constraint conditions can be facilitated, and the solids can be moved at a high efficiency.

Note that the geometric constraint conditions may be displayed in different modes between in the completely-assembled state and in the incompletely-assembled state, thereby making it possible to easily recognize the completely-assembled state and incompletely-assembled state on the screen. Therefore, the time for the recognizing operation can be reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A geometric constraint condition displaying apparatus for displaying a plurality of multidimensional graphics and geometric constraint conditions for regulating positional relationships between an element of one multidimensional graphic and an element of another multidimensional graphic arranged within a multidimensional space, said apparatus comprising:

first storage means for storing items of graphic display data for displaying the plurality of multidimensional graphics;

second storage means for storing the geometric constraint conditions; and displaying means for displaying the plurality of multidimensional graphics based on the items of graphic display data stored in said first storage means within the multidimensional space in positional relationships in conformity with the geometric constraint conditions stored in said second storage means, specifying elements of the multidimensional graphics regulated by the geometric constraint conditions and types of the constraints with respect to the geometric constraint conditions, specifying a color for the elements regulated based on the geometric constraint conditions and the types of the constraints before and after establishing the positional relationships of the plurality of multidimensional graphics, and displaying symbols or numerals corresponding to geometric constraint definitions on a pair of elements located based on the geometric constraint conditions before establishing the positional relationships between the plurality of multidimensional graphics and erasing the symbol or the numeral displayed on one element in the pair of elements after establishing the positional relationships between the plurality of multidimensional graphics.

2. A geometric constraint condition displaying apparatus according to claim 1, further comprising:

an input unit for inputting the geometric constraint conditions; and a geometric constraint condition updating unit for updating the geometric constraint conditions stored in said second storage means.

3. A geometric constraint condition displaying apparatus according to claim 2, wherein said input unit is capable of receiving an input indicating deletion of a specified geometric constraint condition, and wherein said geometric constraint condition updating unit, in case said input unit inputs the indication that the geometric constraint condition is to be deleted, deletes the specified geometric constraint condition from within said second storage means.

4. A geometric constraint condition displaying apparatus according to claim 3, wherein said displaying means, in case said geometric constraint condition updating unit updates the geometric constraint conditions stored in said second storage means, establishes the positional relationships between the plurality of multidimensional graphics in conformity with the updated geometric constraint conditions and performs the display for specifying the elements regulated in positions by the updated geometric constraint conditions and the types of the constraints.

5. A geometric constraint condition displaying apparatus according to claim 3, wherein said displaying means specifies the pair of elements the positions of which are regulated based on the geometric constraint conditions by a line connecting the elements.

6. A geometric constraint condition displaying apparatus according to claim 1, wherein said displaying means specifies the pair of elements the positions of which are regulated based on the geometric constraint conditions by symbols or numerals corresponding to the types of the geometric constraints displayed on the elements.

7. A geometric constraint condition displaying apparatus according to claim 6, wherein said displaying means specifies the pair of elements the positions of which are regulated based on the geometric constraint conditions by symbols or numerals corresponding to the types of the geometric constraints displayed on the elements.

8. A geometric constraint condition displaying apparatus according to claim 1, wherein said displaying means, in case the positional relationships between the plurality of multidimensional graphics are established by the plurality of geometric constraint conditions stored in said second storage means, performs the display for specifying the elements regulated based on the geometric constraint conditions and the types of the definitions thereof in a mode different from that before being established.

9. A geometric constraint condition displaying apparatus according to claim 1, wherein said displaying means specifies the respective pair of elements that are regulated based on the geometric constraint conditions by a line connecting the elements before establishing the positional relationships between the plurality of multidimensional graphics and erases the line after establishing the positional relationships between the plurality of multidimensional graphics.

10. A geometric constraint condition displaying apparatus according to claim 1, wherein said displaying means displays the symbols or the numerals corresponding to the geometric constraint definitions on the pair of elements located based on the geometric constraint conditions before establishing the positional relationships between the plurality of multidimensional graphics and erases the symbol or the numeral displayed on one element after establishing the positional relationships between the plurality of multidimensional graphics.

11. A geometric constraint condition displaying apparatus according to claim 1, wherein said multidimensional space is a three dimensional space.

12. A method for displaying and editing three-dimensional graphical objects and for displaying and editing geometric constraints between the three-dimensional graphical objects, comprising:

defining each of the three-dimensional graphical objects as a composition of graphical elements;

defining geometric constraints, each geometric constraint denoting a spatial orientation between selected graphical elements of the three-dimensional graphical objects;

displaying the three-dimensional graphical objects on a display, to conform to the geometric constraints by regulating positional relationships between the selected graphical elements of respective graphical objects in accordance with the geometric constraints;

displaying constraint indicators, including at least one of symbols, numbers, and colors, indicating geometric constraints, superposed on the three-dimensional graphical objects displayed on the display device to highlight the geometric constraints for visual identification by a designers, the geometric constraints displayable on a screen in different modes ranging from an incompletely-assembled state to a completely-assembled state, thereby providing visual feedback as to whether assembly has been completed.

13. The method of claim 12, wherein the geometric constraints indicate spatial relationships between graphical solids and include at least one relationship selected from among surface-to-surface parallelism, surface-to-surface coincidence, straight-line-to-straight-line parallelism, straight-line-to-surface coincidence, straight-line-to-straight-line coincidence, surface-to-surface distance, straight-line-to-straight-line distance, point-to-surface distance, point-to-straight-line distance.

* * * * *

UNITED STATES PATENT AND TRADEMARK OFFICE
CERTIFICATE OF CORRECTION

PATENT NO. : 5,784,063

DATED : July 21, 1998

INVENTOR(S) : Nagakura et al.

It is certified that error appears in the above-indentified patent and that said Letters Patent is hereby corrected as shown below:

Col. 16, line 24 [Claim 12, line 21], "designers" should be --designer--.

Signed and Sealed this

Second Day of February, 1999

Attest:

Attesting Officer

*Acting Commissioner of Patents and Trademarks*